Aug. 11, 1925. 1,549,205
G. R. MEYERCORD
JOINT BETWEEN METAL SHEATHED BOARDS
Filed May 20, 1921
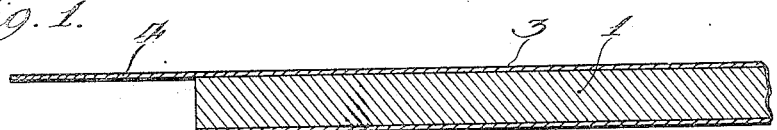
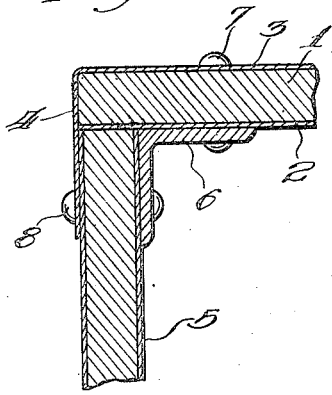
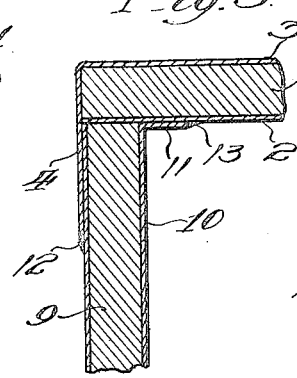
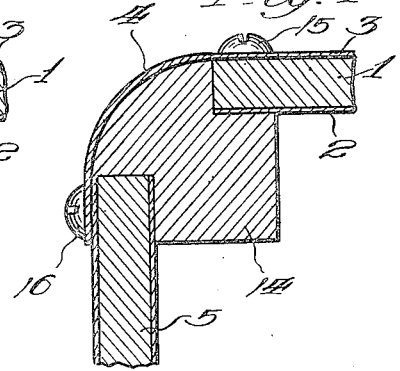
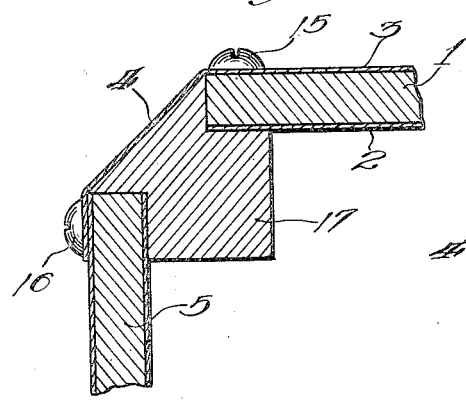
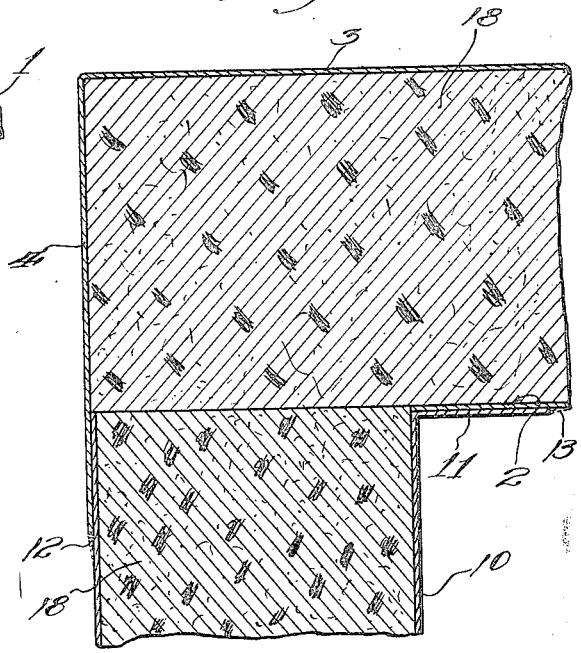
Witness:
Stephen J. Rebora
Inventor:
George R. Meyercord
by Chamberlin Brendenreich
Attys.

Patented Aug. 11, 1925.

1,549,205

UNITED STATES PATENT OFFICE.

GEORGE R. MEYERCORD, OF CHICAGO, ILLINOIS, ASSIGNOR TO HASKELITE MANUFACTURING CORPORATION, A CORPORATION OF NEW YORK.

JOINT BETWEEN METAL-SHEATHED BOARDS.

Application filed May 20, 1921. Serial No. 471,122.

*To all whom it may concern:*

Be it known that I, GEORGE R. MEYERCORD, a citizen of the United States, residing at Chicago, county of Cook, State of Illinois, have invented a certain new and useful Improvement in Joints Between Metal-Sheathed Boards, and declare the following to be a full, clear, and exact description of the same, such as will enable others skilled in the art to which it pertains to make and use the same, reference being had to the accompanying drawings, which form a part of this specification.

My invention relates to the art of joining metal sheathed boards or sheets and has for its object to produce a simple and novel construction and arrangement of parts whereby two such boards or sheets may readily be connected together so as to form an angle with each other with the metal sheathing extending in a continuous piece past said angle.

The various features of novelty whereby my invention is characterized will hereinafter be pointed out with particularity in the claims; but, for a full understanding of my invention and of its object and advantages, reference may be had to the following detailed description taken in connection with the accompanying drawing, wherein:

Figure 1 is a section through one end of a board sheathed with metal on both sides and having the metal on one side extended to form a joint;

Fig. 2 is a transverse section through a joint or corner between two boards arranged at right angles to each other, one of the boards being similar to that in Fig. 1;

Fig. 3 is a view similar to Fig. 2 showing a further modification;

Fig. 4 is a view similar to Figs. 2 and 3, showing a still further modification;

Fig. 5 is a view similar to Fig. 4 showing the corner flattened instead of rounded; and Fig. 6 is a view similar to Fig. 3, showing a construction employing a heavier core than that in Fig. 3.

Referring to Fig. 1 of the drawing, 1 represents a core of wood or other suitable non-metallic material in the form of a sheet or board of any desired thickness and of any desired number of layers. The member 1 is sheathed on one or both sides with metal, preferably thin sheet metal. In the arrangement shown, there is sheathing on both sides of the core, as indicated at 2 and 3. The sheathing member 3 is extended beyond the end of the board, proper, as indicated at 4.

In Fig. 2 I have shown how the structure illustrated in Fig. 1 may be joined to another board to form an angle therewith. In this figure 5 represents a metal-sheathed board as a whole, this board having its edge set against the marginal portion of the board shown in Fig. 1, on the side opposite to the projecting flange 4. The flange 4 is then bent downwardly across the edge of the board of which it forms part and across the adjacent portion of the outer face of the board 5. A suitable reinforcing member as, for example, an angle iron, 6, may be set inside of the corner formed between the two boards; the reinforcing member being fastened to the boards by any suitable fastening means such, for example, as rivets, 7 and 8, the rivet 8 passing not only through the reinforcing member and the board but also through the part 4 of the other board.

In Fig. 3 the arrangement is slightly different from that in Fig. 2; there being no separate reinforcing member in the corner, but the inner sheathing layer, 10, of the board 9 being continued beyond that end of the board which engages with the other board, as indicated at 11, and being bent laterally so as to lie against the inner face of the other board. The two boards are secured together by fastening each board to the flange on the other. In the arrangement shown, lines of solder, 12 and 13, are placed along the free edges of the flanges 4 and 11, respectively, securing these flanges to the adjacent sheathings with which they engage, thus forming a sealed joint between the two boards.

The arrangement shown in Fig. 4 is similar to that in Fig. 2 except that the two boards are not brought directly into engagement with each other, a suitably shaped corner post, 14, being inserted between the adjacent ends of the boards; and the flange or projection, 4, being continued over the corner post and beyond the same to overlap the board 5. Both boards are fastened to the corner post, conveniently by means of screws, 15 and 16, the screw 16 passing through the flange 4 as well as through the underlying portion of the board, 5.

Fig. 5 shows a construction similar to

Fig. 4 except that the corner post, 17, has a flattened outer face across which the flange 4 extends, instead of being rounded as shown in Fig. 4.

The construction shown in Fig. 6 is the same as that in Fig. 3 with the exception that the core member, 18, of each of the boards is in the form of cork board or other material especially adapted for heat insulating purposes, being much thicker than the cores shown in Fig. 3.

I claim:

1. A structure comprising two metal-sheathed boards arranged with the broad faces of one at an angle to the corresponding faces of the other, one of said boards being engaged at one marginal portion with an edge of the other board, and the sheathing on the outer face of one of said boards being continued past the joint and overlapping the sheathing on the outer face of the other board.

2. A structure comprising two metal-sheathed boards arranged with the broad faces of one at an angle to the corresponding faces of the other, one of said boards being engaged at one marginal portion with an edge of the other board, and the sheathing on the outer face of one of said boards being continued past the joint and overlapping the sheathing on the outer face of the other board, and the sheathing on the inner face of one of the boards being continued past the joint and overlapping the inner face of the other board.

3. A structure comprising two metal-sheathed boards arranged with the broad faces of one at an angle to the broad faces of the other and having an edge of one in the vicinity of an edge of the other, the metal sheathing on the outer broad face of one of the boards being continued past the joint between the boards and overlapping the sheathing on the outer face of the other board.

In testimony whereof, I sign this specification.

GEORGE R. MEYERCORD.